Sept. 25, 1962 S. H. AARONSON 3,055,288
APPARATUS FOR COOKING EDIBLE MEATS
Filed Sept. 25, 1958 2 Sheets-Sheet 1
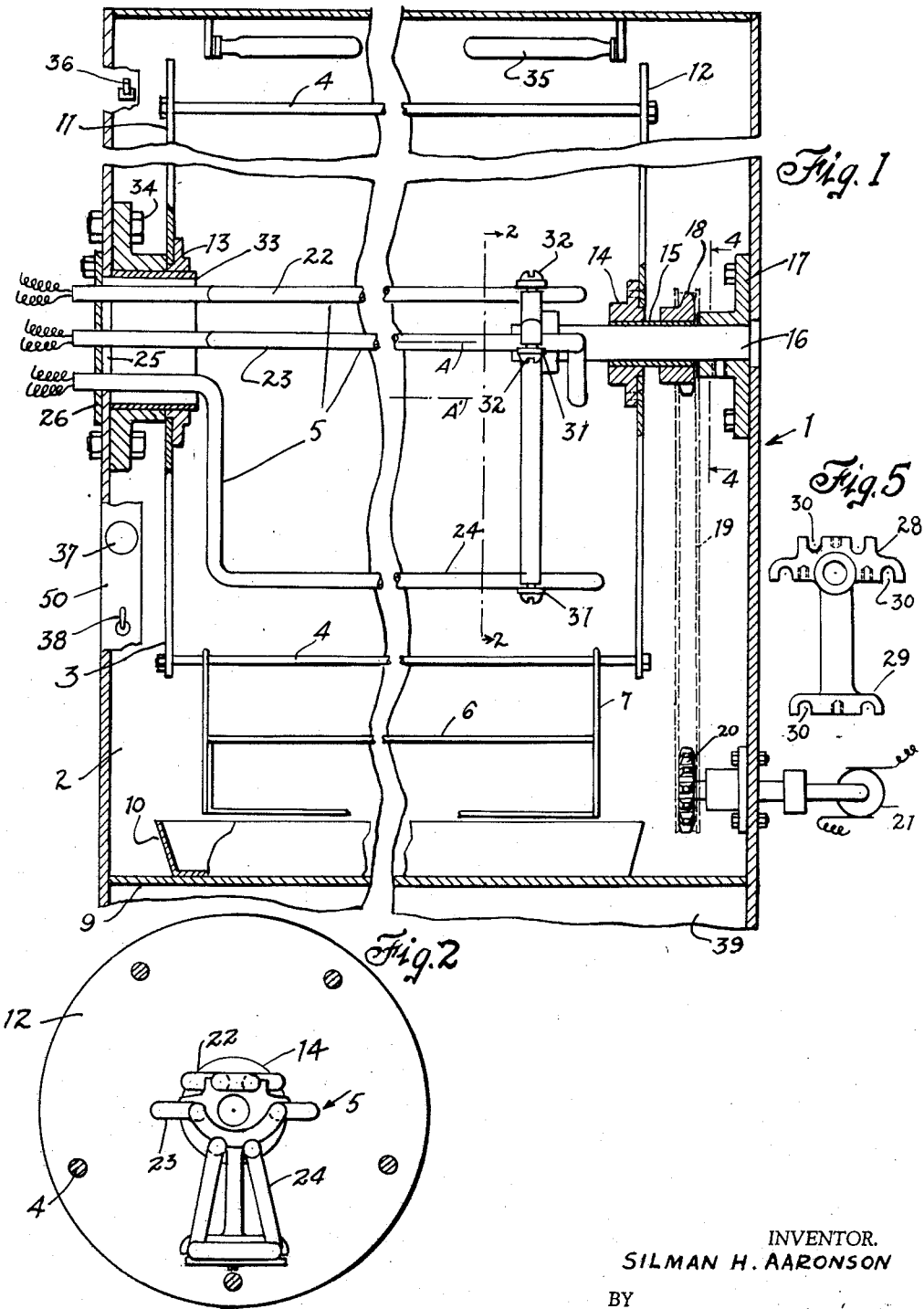
INVENTOR.
SILMAN H. AARONSON
BY
William F. Nickel
ATTORNEY

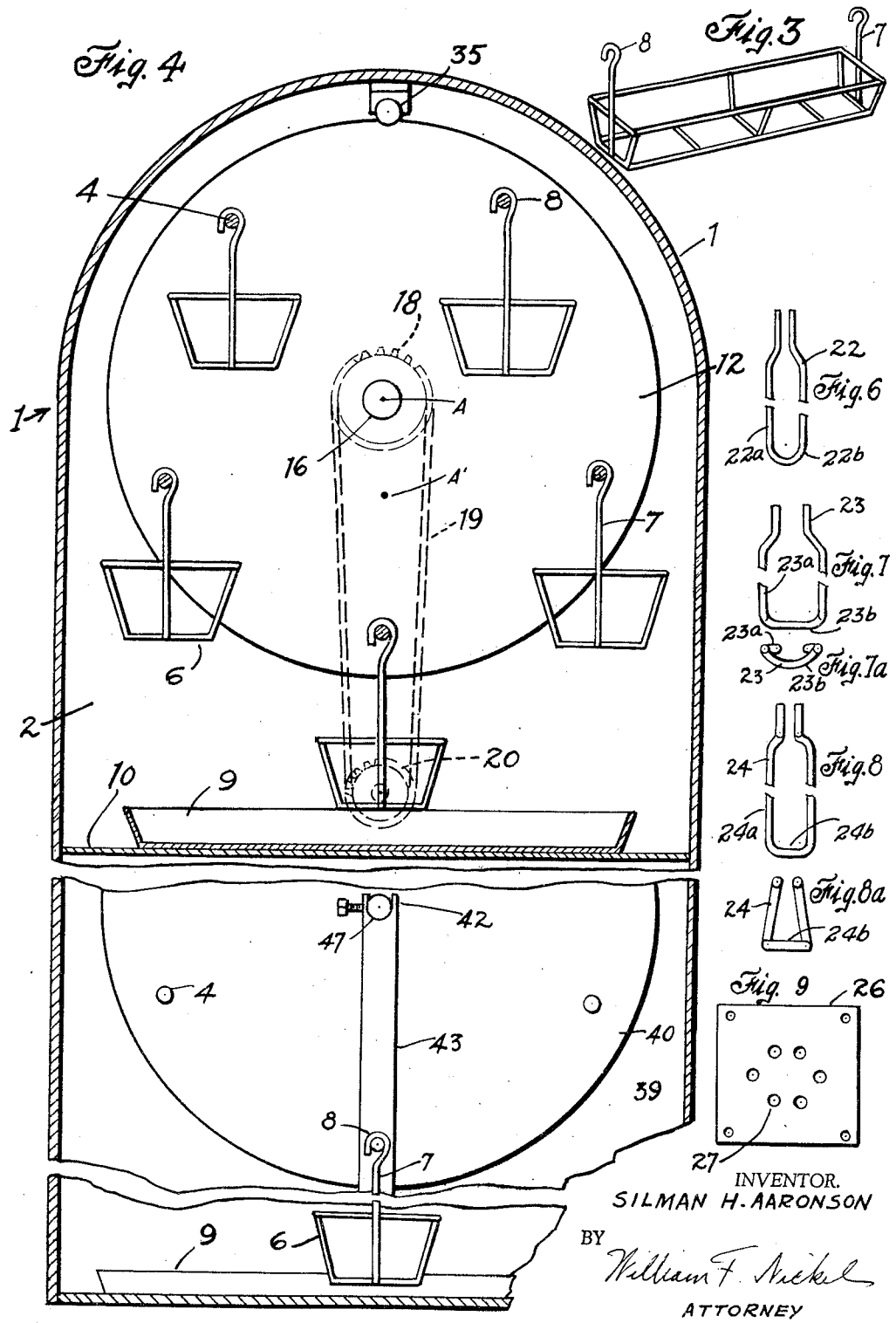

3,055,288
APPARATUS FOR COOKING EDIBLE MEATS
Silman H. Aaronson, 218 Beach 148th St., Neponsit, N.Y.
Filed Sept. 25, 1958, Ser. No. 763,213
5 Claims. (Cl. 99—427)

My invention is an improved apparatus for cooking edible meats; especially a heating unit for broiling and roasting in barbecue fashion pieces and chunks of meat such as beef, pork, etc., dressed chickens and other fowls and animals of comparable size, weight and savor.

An important object of this invention is to provide apparatus containing efficient heating means and of such construction that meats therein are directly exposed over each of their entire surfaces continually and repeatedly to the heating means; and the viands are thus roasted evenly and uniformly throughout. Hence, all their taste, flavor, and palatability are fully retained.

Another object of this invention is to provide a heating unit which comprises an open rotatable carrier to which the meats are movably attached at points spaced from its center, and a member in the carrier adapted to emit heating radiations in all directions, and especially from the interior of the carrier through the perimeter thereof, to subject all parts of the meats successively to to the most intense action of the heating member at each revolution.

Another object is to provide a heating and roasting apparatus having an open, cage-shaped carrier, rotatably mounted to turn on a horizontal axis, with a heating member within and extending over the full length thereof; and receptacles or trays freely suspended from parts of the carrier at separated points on its periphery, so that, upon each rotation, each receptacle presents its open top, one open side, open bottom and then its remaining open side successively to the full force and effect of the heating member. The viands to be roasted repose in the receptacles until they are done in rare, medium or fully roasted condition as may be desired.

A further object is to provide a roasting unit with a horizontal rotatable carrier and heating means inside, designed for operation by an electric current.

Still another object is to provide a roasting unit comprising a housing, with rotatable carrier and heating member inside and power means connected with the housing to rotate the carrier while the roasting is in progress.

An additional object is to provide such a housing with one or more lamps having infra-red properties to supplement the roasting action of the heating means.

A still further object is to provide cooking apparatus for roasting meats, as outlined above, with the carrier rotatably mounted in the housing, and the heating unit in fixed or stationary position surrounded by the carrier, but with the parts thereof arranged properly around the axis of revolution through which the contents of the trays are moved.

Other objects and the advantages of my invention are set forth in the ensuing detailed specification, and the novel characteristics are clearly defined in the appended claims. The drawings illustrate some embodiments of my improved unit in a practical construction, but variations may be adopted in many respects without departure from the essential design in which the invention resides.

On the drawings:

FIGURE 1 is a front elevation of the apparatus, the housing being in section.

FIGURE 2 is a section on line 2—2 of FIGURE 1; through the carrier only.

FIGURE 3 is a perspective view of one of the trays or receptacles in which the meats are deposited for roasting.

FIGURE 4 is an end view of the carrier, partly diagrammatic, in the housing, with the receptacles attached, as seen along line 4—4 viewed from the right of FIGURE 1.

FIGURE 5 is a front elevation of a bracket which supports the end of the heating member within the carrier.

FIGURE 6 shows in plan an end elevation, the top member or section of the heater member.

FIGURES 7 and 7a show respectively a top plan and an end elevation of the intermediate heater portion.

FIGURES 8 and 8a are a top plan and end view respectively of the lower heater section.

FIGURE 9 shows a plate for supporting the parts of the heating member where it enters the casing.

The apparatus of my invention is disposed within a housing 1 having an upper compartment 2, in which is a horizontally supported rotatable carrier 3, having, for example, five cross bars 4. On the interior of the carrier is a heating member 5, and on the bars 4 are suspended receptacles that are open work, metal trays or baskets 6 for holding the meats in proximity to the member 5 during the entire roasting process. The trays 6 have upright arms or rods 7 one at each end with hooks 8 at the top engaging the bars 4, and hang freely, always in vertical position, as the carrier turns. Hence, the contents of each of the trays are exposed over all their surfaces and in succession to the heating action of all parts of the member 5; for example, one open side of each tray momentarily at the front of the carrier as seen in FIGURE 1 is presented to the member 5, then the open bottom as it passes through uppermost position, next the open opposite side, and finally the open top as it swings through the low point in each revolution. Any meat is thus roasted evenly throughout and then none of the quality and richness of the viands that appeal to the diner's taste are lost. The compartment 2 also has a bottom 9 and a pan 10 thereon beneath the carrier, to collect melted fats and other substances that drip into it from the contents of the trays 6.

Since the trays or baskets 6 always depend from the bars 4 in vertical position, each tray at the high point of its revolution is closer to the axis A of the carrier than the tray that is passing through the lowest point of its travel as the carrier is rotating. Hence the center or axis A' of revolution of the group of trays 6 is not concentric with the axis of the carrier 3 but below it. The heater 5, which comprises several sections, shown as three in number, must be supported within the carrier accordingly; one section 22 at the top being relatively close to the axis of rotation of the carrier, an intermediate section 23 in two parts, one at each side being farther from this axis, and a lower section 24 in two parts each at a distance from the same axis that is greatest. But all the sections of the heating unit are near enough to the trays 6 as the latter pass them, with the result that the heating temperatures at all the trays are sufficient to give the best roasting effects.

The rotating cage forming the carrier is made up of a pair of circular plates or disks 11 and 12, the rims of which are connected by the rigid bars 4 located between these disks. One plate has a fixed hub 13, and the other has a fixed hub 14 within which is fixed a tubular trunnion 15; said hubs and trunnion enabling the cage to rotate in the housing 1.

The hollow trunnion 15 is smaller than the hub 14 and is rotatably mounted on a stationary shaft 16 affixed to a mounting plate 17 in the housing 1, secured to the adjacent side thereof. The shaft or journal 16 projects through the trunnion 15 and adjacent end disk 12 of the carrier and the trunnion 15 carries between the side wall of the housing 1 and the carrier a fixed gear 18 which is fixed thereon and connected by a chain 19 to a gear 20, operated by a motor outlined at 21. This motor is provided with the usual gear reduction attachment between its shaft, and the gear 20, and is mounted in any suitable position adjacent the side wall of the housing, with a casing or cover, not shown, which is removable, if desired, so that access to the motor can easily be had. The tubular trunnions 15 can thus be rotated on the shaft or journal 16 by the chain 19 to turn the carrier and keep the meats in the baskets 6 moving around the heating member 5.

The member 5 is made up of a top section 22, an intermediate section 23, and a lower section 24, which are disposed about the axis of revolution A' of the group of baskets 6 hanging from the bars 4, this axis being eccentric and somewhat below the axis A of rotation through the journal 16. The shape of the sections is indicated in FIGURES 6, 7, 7a, 8 and 8a; all of which enter the carrier through the hub 13. The upper section 22 comprises a pair of tubular elements or lengths 22a which pass into the carrier at the left of the housing 1 as shown in FIGURE 1, and are connected to each other as at 22b adjacent plate 12 of the carrier, above the journal 16. The mid-section 23 also comprises a pair of tubular elements 23a united at their inner ends adjacent the plate 12, and the lower section 24 also comprises a pair of tubular elements 24a also united at their inner ends 24b near the plate 12; all with electric heating coils therein. The sections 22, 23 and 24 with their lengths and ends fully illustrated in FIGURES 6, 7 and 7a, 8 and 8a respectively. The left side of the housing 1 has an aperture 25 over which is a plate 26 secured to the outside of the housing, and having holes 27 through which the elements of the heating member extend. At their inner ends, the united extremities of each section 22, 23 and 24 are supported on a T-shaped bracket having a cross-bar 28 at its upper end, and a shorter cross-bar 29 at the bottom or foot. This supporting member or bracket is rgidly secured on the inner end of the fixed journal 16 at the mid-point of the top bar 28, which has notches 30 in its upper edge near the middle for the two lengths of the top section 22; and also has similar notches in its lower edge near its ends for the two elements of the mid-section 23; and the foot 29 has notches in its lower edge to seat the two elements of the lower section 24. All the elements of the heater are secured in the seats or notches 30 by plates 31 held by screws 32.

The axis of the plate 26 is in line with the journal 16, but the elements of the top section 22 and mid-section 23 are spread sideways after passing through the hub 13 and end disk 11; the parts of the mid-section 22 thus being nearer the sides of the baskets 6 as the latter pass them. The sections 22 heat the bottoms of the baskets and contents over the top section; the middle or intermediate section 23 emits heat against the sides thereof, and the elements of the bottom section 24, after passing through the hub 14 and end 11 of the carrier, are bent downward so as to be nearer to the tops of the baskets as they swing through the lowest arc in the revolution thereof. The coils within the heating elements are connected to an electric circuit and the wiring thereof can have any well-known arrangement. The connections for these heating elements need not be shown, as they are not part of the invention.

The end disk 11 bearing the hub 13 is rotatably supported on a fixed tubular journal 33, secured in a mounting plate or hollow journal 34 made fast to the inside of the housing around the opening 26, and all the heating sections enter the housing and carrier 4 through the journal 33.

The top of the housing has inside a pair of infra-red ray lamps 35, and the front of the housing at one side bears a switch 36 by which current can be controlled for the lamps 35, a heater knob 37 for controlling the current through the heating member, and a switch 38 for turning on the current to the motor and opening the circuit thereof. The lamps 35 radiate from the top of the housing downward. The roasting of the meats in the baskets thus proceeds as above set forth, and as all of the sections of the heating member emit heat repeatedly upon the tops, bottoms and sides of the meats, the viands are roasted evenly.

Beneath the compartment 2 containing the carrier and heating member is another compartment 39 in which is mounted a similar cage carrier 40 having trunnions 47 on its ends resting in notches 42 on supporting posts 43. One or both of the parts 43 may have a slot extending downwards a predetermined distance from the supporting notch 42, so that the portions of the sides of the post at the slot can exert pressure on trunnion 41. Hence the carrier can be held stationary in any position. When the contents of the baskets 6 are done, the motor is stopped and the current cut off for the heating member, so that the baskets can be lifted from the carrier 3 and transferred to the carrier 40 in the compartment 39 to be kept warm until called for.

The sections 22, 23 and 24 are so designed and disposed as to make the temperatures to which the top, sides and bottom of the contents of the baskets are exposed as they are revolved in the housing 1 substantially equal, or as nearly so as possible. At the top of the heating member, the effect of the section 22 is supplemented by the action of the infra-red lamps 35, and the current in the upper section 22 of a full size apparatus produces heat with the expenditure, for example, of about 1400 watts. When passing over the section 22, the contents of the baskets 6 are relatively close to the member 5, and when passing under the section 24 they are farthest therefrom. Likewise, in passing the two side elements of the section 23, the meats are somewhat farther from each element than when each basket is above the section 22. Hence, the coils and the current in the whole of the section 23 are designed to consume, say 1800 watts; and the lower section 24 can take about the same wattage as the intermediate section, thus consuming about 5,000 watts in all. Of course, the heat tends to rise in the casing from the lower section 24 and thus the heating effect is adjusted so that the roasting effect is virtually even on all sides of the meats in the basket 6.

FIGURES 7a and 8a are end views of the sections 23 and 24 respectively, and FIGURE 4 merely shows the arrangement of the baskets on the carrier, as if the carrier were seen in vertical section on a line through the middle thereof, the heater sections being omitted for the sake of convenience. The switches 36, 37 and 38 are supported by an inward projecting edge 50 of the casing, at the front thereof; and this casing may of course have an open front which can be closed by a glass panel, so that the operation of roasting can be watched.

Obviously the roasting would be accomplished in the same way and with the same effects if the meats, fowls, etc., were directly suspended on the bars or supports 4, because all sides of the viands would again be directly exposed to the sections of the heating means during each revolution.

Having described my invention, what I believe to be new is:

1. Roasting apparatus comprising a rotatable carrier having upright ends, means engaging said ends including a hollow journal at one end, for supporting the carrier to rotate about a horizontal axis, separated bars connecting said ends for suspending receptacles thereon, fixed multiple heating means extending through said journal into said carrier, and a fixed bracket inside the carrier adjacent the opposite end connected to the heating means, said means having separate spaced apart sections each of which includes a pair of tubular elements connected together at said bracket, said sections being disposed parallel to said axis, said heating means having one section being above the axis and another section below said axis, and an intermediate section at the sides of the axis with its elements separated more widely than the elements of the upper section, said sections being at varying distances from said axis the elements of the lower section being bent downward and then longitudinally of said carrier for the greater part of their lengths.

2. Roasting apparatus comprising a rotatable carrier having upright ends, means engaging said ends including a hollow journal at one end, for supporting the carrier to rotate about a horizontal axis, separated bars connecting said ends for suspending receptacles thereon, fixed multiple heating means extending through said journal into said carrier, and a fixed bracket within the carrier adjacent the opposite end connected to the heating means, said means having separate spaced apart sections each of which includes a pair of tubular elements connected together at said bracket, said sections being disposed parallel to said axis, said heating means having one section above the axis and another section below said axis, and an intermediate section at the sides of said axis with its elements separated more widely than the elements of the other section, said sections being at varying distances from said axis the elements of the lower section being bent downward and then longitudinally of said carrier for the greater part of their lengths, said bracket being T-shaped, the upper and intermediate sections being secured adjacent the top thereof, and the lower section adjacent the bottom.

3. Apparatus for roasting meats comprising an openwork carrier with upright ends, bars connecting said ends, a tubular trunnion secured at one end of the carrier, a fixed journal supporting said trunnion at said end, a gear fixed on said trunnion, the opposite end of the carrier having a hub, a hollow journal supporting said hub, the carrier being rotatable on said fixed and hollow journals about an axis, multiple heating means extending into the carrier through the said hollow journal, said means comprising spaced apart sections, each section including a pair of straight tubular elements parallel to each other and to the axis of the carrier, the elements of each section being connected at their inner ends, and means secured to said fixed journal within the carrier for supporting said sections, the elements of each section being united at said supporting means, said sections being at varying distances from said axis.

4. Roasting apparatus comprising a carrier having upright ends, means engaging said ends including a hollow journal at one end, for supporting the carrier to rotate about a horizontal axis, separated bars connecting said ends for suspending receptacles thereon, multiple heating means extending through said journal into said carrier, and a fixed bracket inside the carrier adjacent the opposite end connected to the heating means, said heating means having separate spaced apart sections, each of which includes a pair of straight parallel tubular elements extending parallel to said axis and connected together at said bracket, said elements being above, below and at the sides of said axis, said sections being at varying distances therefrom.

5. Apparatus for roasting meats comprising an openwork carrier with upright ends, a tubular hub secured to one end of the carrier, a fixed journal supporting said hub, the opposite end having another hub, a hollow journal supporting said last-named hub, the carrier being rotatable about a horizontal axis on said fixed and hollow journals, multiple heating means extending into the carrier through said hollow journal, said means having spaced apart sections, each including a pair of parallel straight tubular elements, extending parallel to said hubs and said journals, an upright T-shaped bracket rigid with said fixed journal and disposed inside the carrier supporting said sections, and having notches adjacent its upper and lower ends in which said sections are seated, the elements of each section being united at said bracket, and being parallel to said axis, said sections being at varying distances therefrom.

References Cited in the file of this patent
UNITED STATES PATENTS

| | | |
|---|---|---|
| 1,634,142 | Hammond | June 28, 1927 |
| 2,705,913 | Bloom | Apr. 12, 1955 |
| 2,775,189 | Scholl | Dec. 25, 1956 |